UNITED STATES PATENT OFFICE.

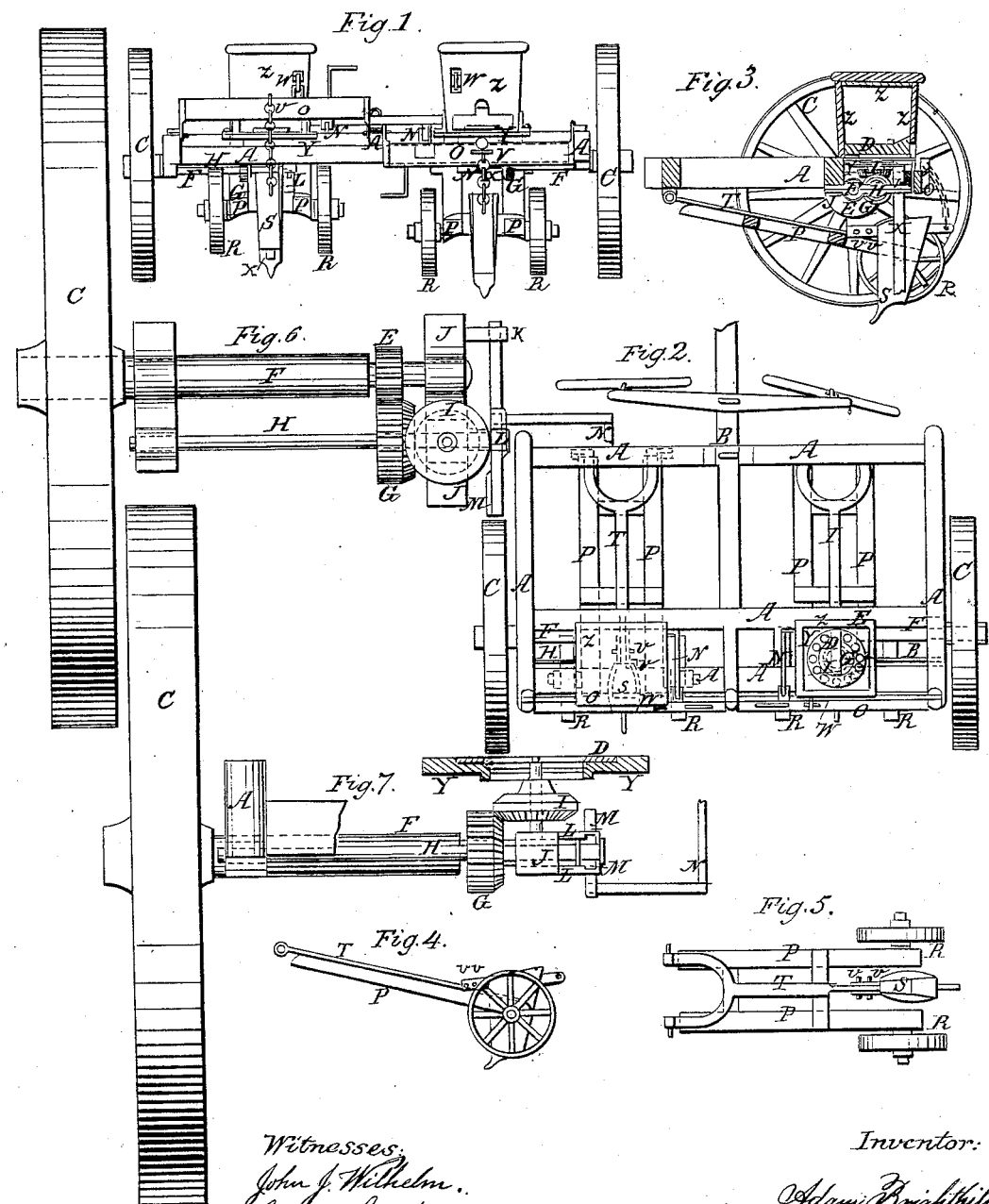

ADAM BRIGHTBILL, OF BETHEL TOWNSHIP, LEBANON COUNTY, PENNSYLVANIA, ASSIGNOR TO HIMSELF AND JNO. BRIGHTBILL, OF SAME PLACE.

IMPROVEMENT IN CORN-PLANTERS.

Specification forming part of Letters Patent No. 33,015, dated August 6, 1861.

*To all whom it may concern:*

Be it known that I, ADAM BRIGHTBILL, of Bethel township, in the county of Lebanon, in the State of Pennsylvania, have invented a new and Improved Planter for Planting Corn or Similar Grain; and I do hereby declare that the following is a full and exact description thereof, reference being had to the accompanying drawings, and to the letters of reference marked thereon, forming a part of this specification, in which—

Figure 1 is a back view of the planter in elevation. Fig. 2 is a top view, part section, part elevation. Fig. 3 is a sectional side view. Figs. 4 and 5 are top and side views of the plow-frame and plow. Figs. 6 and 7 are top and side views on an enlarged scale, showing the gearing and manner of connecting and disconnecting the planting arrangement.

Similar letters of reference indicate correspond parts in the different figures.

My improved corn-planter consists in a suitable frame, to which are attached two movable frames, carrying each a peculiar-shaped plow. The main frame, to which is attached the planting apparatus, is supported by two large wheels. The movable frames are also supported each by two small wheels. A revolving perforated ring distributes the corn, which, dropping through a perforation in a lower plate or ring into the interior of the plows, is deposited at a suitable depth and distance in the ground.

In order to enable others skilled in the arts to make and use my invention, I will proceed to describe its construction and manner of operation.

A is the frame, to which is attached the draft-pole B.

C are the wheels supporting the frame A, and giving motion to the perforated ring D by means of the gear-wheel E, keyed on the axle or shaft F, to which the wheels C are immovably fastened. The wheel E gears into a wheel, G, on a second or counter shaft, H. The wheel G has beveled cogs on its face, which cogs gear into the wheel I, to the shaft of which is secured the perforated ring D. The box J, which forms the bearings for the shafts F and H, is furnished with two projecting lugs, K and L. Through square openings in the end of these lugs L works the shifting bar M. Inclined planes in this bar embrace the collars on the end of the shaft H. The incline planes are also embraced by the lugs K L. The rod N connects the bar M with the hinged piece O.

P are the plow-frames, the front ends of which frames are hinged to the main frame A, the rear ends being supported by the wheels R. The rear end also supports the plow S. The front end of the plow S is connected to the bars by means of two wooden pins, U. The back end of the plow S is connected to the hinged piece O by means of the chain V.

W is a latch to secure the piece O in its position when the plows S are out of action. A flexible pipe or hose, X, is attached to the under part of the plate Y, immediately under the hole in this plate through which the grain drops. This hose enters the interior of the plow and conveys the grain to its proper place. The box or hopper Z is secured over the plate Y by means of lugs and pins on its side.

The manner of operating my corn-planter is as follows: When the planter is ready for the field the frames P, to which the plows S are attached, are raised by means of the hinged piece O, connected to the plow-frames P by the chains V, the latches W securing it in that position. On being brought to the position for planting, the plow-frames P are lowered, when the small wheels R, rolling on the surface, guide the depth of the plows S, which plows are set the required distance below the wheels R. It will be observed that the plows S are closed at the back end, thus forming a box or chamber within the plow, which serves as a guide for the flexible pipe or hose X. Also observe the position of the two wooden pins U U, which are so arranged that on the plow meeting any obstruction the point of the plow, drawing backward, will wrench off the pins U U. The two pins U U are required to keep the plow S in proper position when in action. The lowering of the plow-frames P also throws the gear-wheels G and I into gear by means of the shifting bar M, attached to the hinged piece O by the rod N. The planter being now put into motion, the revolution of the wheel C, through the gears E, G, and I, revolves the perforated ring D on the plate Y, when the holes or perforations in the ring D catch the corn from the hopper Z, which has been previously filled, rotate it under a small brush until it comes opposite the hole in the plate Y, when it drops through this hole into the flexible pipe or hose X into the interior of the plow, which deposits it at a suitable depth in the ground. The holes in the ring D are arranged at such a distance apart as it is desirable to plant the corn, the gearing E, G, and I being so arranged as to give a relative position to the wheels C and holes in the ring D.

My drawings represent my planter as double—that is, planting two rows at the same time. It is obvious, however, that it may be made single for planting but one row at a time.

The advantages I claim for my planter are as follows: Having an independent plow-frame running on its own wheels and capable of being set to plant to any depth, the lowering and raising of this plow-frame in order to pass obstructions also facilitating its passage over and from field to field; the manner of throwing out of gear the planting apparatus, which is effected by the same movement that raises the plow-frame; also, the peculiar-shaped plows, whereby they can be constructed of very light sheet-iron, and at the same time afford a close chamber or box protecting the flexible pipe or hose within it.

Having thus fully described the nature of my invention and its mode of operation, what I claim as new, and desire to secure by Letters Patent, is—

1. The independent plow-frame P, wheels R, plows S, bar T, pins U U, combined and arranged for the purpose as more fully described and specified.

2. The combination of the gear-wheels G, shaft H, shifting bar M, lugs K and L, for the purpose of throwing the planting apparatus into and out of gear, as herein described and specified.

3. The frame A, when used in combination with the independent plow-frame P, as herein more fully described and specified.

ADAM BRIGHTBILL.

Witnesses:
  JOHN J. WILHELM,
  GEORGE STRICKLER.